May 20, 1952  H. L. GROSS  2,597,317

WATER KITE

Filed April 27, 1951

INVENTOR

Herbert L. Gross

Patented May 20, 1952

2,597,317

UNITED STATES PATENT OFFICE 2,597,317

WATER KITE

Herbert L. Gross, Parkton, Md.

Original application April 26, 1949, Serial No. 89,617, now Patent No. 2,556,423, dated June 12, 1951. Divided and this application April 27, 1951, Serial No. 223,309

1 Claim. (Cl. 43—43.13)

This invention relates to fishing tackle and equipment and especially to that employed for trolling or casting. Further it pertains to the use of a kite or sail on a fishing line, for the purpose of guiding the hook and bait through a predetermined course in the water.

This is a division of application Serial No. 89,617, now Patent No. 2,556,423.

The conventional fishing line employing a kite or sail is characterized in its travel through water by erratic movements that are not capable of being controlled. This is particularly objectionable where several fishermen are fishing from a boat close to one another as the environment will permit, with their lines tending to entangle with one another. Where the fishing is done from a moving marine vessel, the general tendency for the fishing lines is to follow the vessel directly behind and thereby placing the fisherman and the boat in the line of vision of the fish. In this invention, a kite or sail is attached to the fishing line to travel in the water, and is of a form that permits the line to be guided in any direction or depth selected by the fisherman. The kite or sail is preferably of an arcuate form with the concave face upwards and the loops for tieing it to the line, on the convex face. To increase the field of adjustability, the attaching loops are located variously over the whole area of the kite so that attachment is made possible by the main fishing line and hook lines to it in a number of divers combination arrangements.

It is an object of this invention to provide a new and improved kite or sail for a fishing line, that will avoid one or more of the disadvantages and limitations of the prior art.

Another object of the invention is to provide a new and improved kite for a fishing line that can be tied into the line and hook in a manner that will permit the directional travel to be controlled closely according to the general intentions of the fisherman, using the fishing line from a moving vessel or during trolling from a stationary location by pulling the line in.

A further object of the invention is to provide a new and improved kite in conjunction with a fishing line designed for controlling the directional travel as to depth and lateral movement.

Other objects of the invention will be disclosed as it is more fully described.

For a clearer understanding of the invention, its objects and the principles thereof, reference is made to the drawings attached herewith. These drawings in conjunction with the following description outline a particular form of the invention by way of example, while the claim indicates the scope of the invention.

Referring to the drawings.

Similar reference numerals refer to the same parts throughout the drawings.

Figure 1:
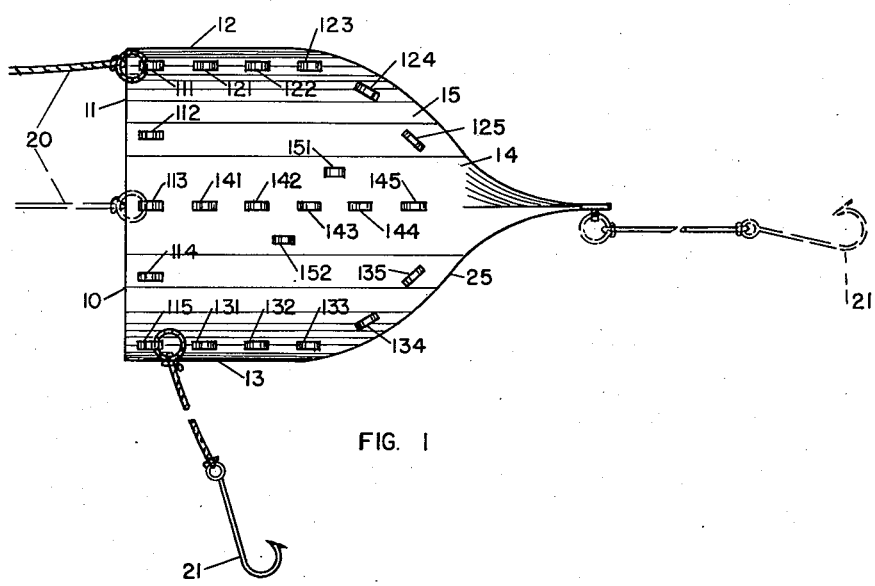
Figure 1 is a plan view of a kite or sail embodying this invention.
Figure 2:
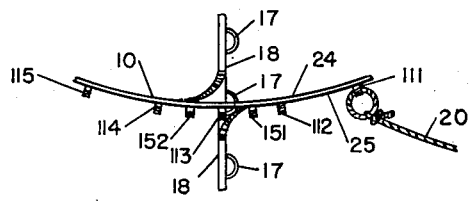
Figure 2, is an end view of Figure 1.
Figure 3:
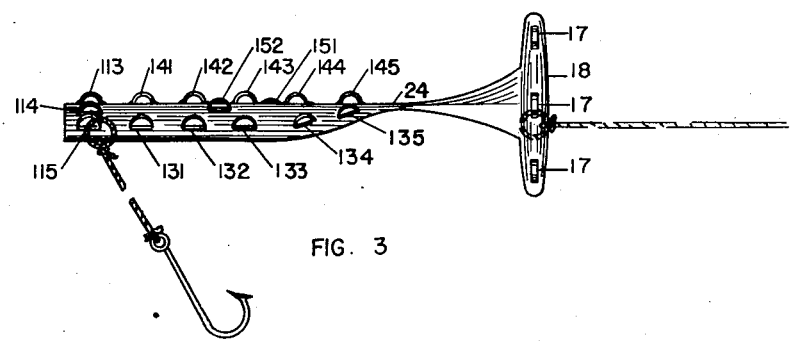
Figure 3, is a side elevation of this particular form of kite.

In the particular form shown, a kite 10 consists of an arcuately bent plate having three side edges 11, 12 and 13 respectively arranged in rectangular contour, the remaining portion of the periphery is cut on an appreciable arc 15, and 25, tapering to a relatively narrow area that extends to an enlarged portion which forms the guide fin 18. This fin is bent, in its narrow section, to an approximate right angle to the plate and provided with loops 17. The underside of the plate 10 is convexed and provided with semi-circular loops that form anchoring points to enable parts of a fishing line 20 and the hook line 21 to be coupled thereto. The loops are numbered individually to identify them in their different locations. Thus those along and adjacent to the edge 11, are numbered from left to right, 111, 112, 113, 114 and 115 respectively. Those along the edge 12, are 121, 122, 123, 124 and 125. Those adjacent to the edge 13 are 131, 132, 133, 134 and 135. A line of loops aligned with the proximate longitudinal axis of the plate are indicated at 141, 142, 143, 144 and 145.

Other loops in other parts of the field are at 151 and 152. The method of attaching the lines depends on the results desired. If for instance, it is desired to have the hook pulled in a direction aligned with the axis of the vessel on which the fisherman is located, the point of attachment of the fishing line 20 is preferably at 113 and the hook line 21 at 17 both on the kite axis. In these positions the line will pull the kite directly in alignment with the boat. It is of course assumed that the boat or vessel is running in a definite and straight direction. The kite and line will follow a course that is straight and near the surface of the water. If a fish bites on the hook 21 it will pull the guide fin downwardly and the rectangular edge 11 will rise. The water pressing against the convex side of the kite in this position will tilt it so that its tendency will induce it to rise to the surface and pull the fish with it. If the fishing line 20 is attached to the loop 111 and the hook to 115 the kite will be tilted angularly towards its side. This will induce the kite to swing off in an arc to the left of the extended axis line of the boat with the action of the guide fin tending to modify the amount of yaw. Should it be desirable to use the action of the guide fin to increase the amount of yaw, the line 20 may be attached to loop 125 with the hook to 115. In this position the guide fin will be forward and will tend to angle out into the flow of water and its action will increase the tendency of the kite to yaw to the right of the line of pull. The speed of the boat will determine the amount of arcuate swing taken by the kite. In these instances it is assumed that the kite is made of material such as metal that is of greater specific gravity than that of the water. Other positions taken by the kite will depend on the speed of the line pulling the kite, where the attachment is made by the fishing line and where the hook line is attached. If the pulling line is attached at or near the axis line, the tendency to yaw becomes less and the arcuate swing is at a smaller angle to the axis.

If the kite is of a type or material that will make its general specific gravity less than that of the water in which it is floated, the action will be modified by the tendency to float. This type is employed for conditions that make it desirable.

The movement of the kite can be varied in the water to create a drag on the line by placing the line 20 for example on loop 152. When the line is pulled on it causes the kite to assume a semi-vertical position in the water and will rotate in a circular manner. The diameter of the circular travel is controlled by the placement of the various loops in a predetermined relation to the transverse and longitudinal axis as well as the radius used for the kite and the area of the guide fin. Without going into the details of all the adjustments and combinations possible with the kite embodying this invention, it can be noted that most of its reactions may be figured out and its use anticipated ahead of time.

The term loops is intended to be broad enough to include not only the bent formations made in the plate and shown in the drawings, but also any small mechanical attachment suitable for the line or hook line to be connected to the plate, at the locations indicated. The term yaw is intended to include the tendency of the plate or kite to swing in a lateral direction as it is pulled through the water, and trolling is the term used for designating the directional pulling of the line through the water.

While but one form of the invention is shown in the drawings and described in the specification, it is not desired to limit this application for patent to this one form only, as it is appreciated that other forms could be made that would use the same principles and come within the scope of the appended claim.

Having thus described the invention, what is claimed is:

A kite for a fishing line comprising an arcuate plate formed with three adjacent sides and edges of substantially retangular contour leading to a fourth side tapered towards a point, said plate being formed with loops at plural locations on the plate for the attachment of said fishing line, sinkers, and hook line, permitting their placement in combinations of selective character tending to tilt the plate at predetermined angles in the water through which the fishing line may be trolled and thereby control the direction of movement thereof as to depth and yaw, and said plate being bent at right angles at its pointed end to provide a guide fin thereon.

HERBERT L. GROSS.

REFERENCES CITED

The following references are of record in the file of this patent:

UNITED STATES PATENTS

| Number | Name | Date |
| --- | --- | --- |
| 2,556,423 | Gross | June 12, 1951 |